Patented Dec. 8, 1936

2,063,811

UNITED STATES PATENT OFFICE 2,063,811

PROCESS OF DECOMPOSING BERYLLIUM MINERALS

Gustav Jaeger, Neu-Isenburg, Germany, assignor to Deutsche Gold und Silber Scheideanstalt vormals Roessler, Frankfort-on-the-Main, Germany, a corporation of Germany No Drawing. Application April 19, 1935, Serial No. 17,337. In Germany April 3, 1934

7 Claims. (Cl. 23—33)

The present invention has for its object a process for decomposing beryllium minerals, particularly beryl.

According to known processes the decomposition of beryllium-containing minerals is effected by fusing the finely powdered minerals with alkaline compounds, such as oxides of the alkali or alkaline earth metals, caustic alkalies or carbonates of the alkali or alkaline earth metals at temperatures of about 500 to 700° C., after which the basic constituents of the fused product are converted by treatment with acids into salts in order to enable the silica to be separated in an insoluble form. Such decomposition processes require a considerable expenditure of fuels. Further disadvantages are to be found in the fact that the fusion vessels are more or less extensively attacked by the alkaline melts at the requisite high temperatures, as a result of which the decomposition products are impurified and the fusion vessels are comparatively quickly destroyed.

According to my present invention the decomposition of beryl and the like starting materials is effected by heating the preferably finely powdered minerals with alkaline compounds, particularly caustic alkalies, in the presence of water to temperatures not exceeding 500° C. In this way it is possible to convert the beryl into a beryllium compound, insoluble in water, aqueous alkalies and the like, but decomposable by, or soluble in, acids. The decomposition product may consequently be extracted with water or aqueous alkaline solutions, the residue be treated with acid with a view to separating the silica and the acid solution be worked up in a manner likewise known per se with the aid of suitable separating operations with a view to recovering the materials contained therein, such as beryllium, aluminium and iron.

About 16 mols of caustic alkali may, for example, be employed per 1 mol. of beryl. The quantity of water to be added may amount to, for example, from 5 to 25% or more calculated on the caustic alkali employed. Such a quantity of liquid is with advantage employed that the reaction materials may be stirred without difficulty. In the presence of considerable quantities of water the process is with advantage carried out in autoclaves. In place of caustic alkali, alkali-yielding compounds, for example tri-alkali phosphate, may also be employed under the given working conditions.

The process of this invention may, for example, be carried into effect by intimately mixing finely powdered beryl with caustic alkali and a suitable quantity of water. Liquefaction may be promoted by gentle warming. The mixture is then heated at a suitable temperature, for example about 400° C., until decomposition is completed. The process may also be carried out at considerably lower temperatures, for example temperatures of about 150 to 200° C., particularly when the operation is carried out in an autoclave and with stirring.

The following examples serve to illustrate how the process of my invention may be carried into effect:

1. 3.6 kgms. of caustic soda are heated in an iron vessel with the addition of 10 to 12% of water until partial liquefaction has taken place. 3.0 kgms. of finely powdered beryl are then introduced with stirring; the mixture is then slowly heated up to about 400° C. and the mass maintained at this temperature for about 10 to 12 hours. The vessel material is not attacked to a detrimental degree thereby. After cooling, the reaction product is extracted with water, whereby about 60% of the alkali and about 20% of the silica present may be removed. The residue is then treated in known manner for the purpose of separating and recovering the beryllium compounds.

An alternative procedure is, for example, to heat the finely powdered beryl with aqueous caustic alkali in an autoclave for example to temperatures of from 150 to 170° C. An approximately 75% soda lye is with advantage used for the purpose.

2. 6.0 kgms. of caustic soda are mixed with 1.0 litre of water. 2.0 kgms. of finely powdered beryl are introduced with stirring into the solution mixture in an autoclave. The temperature is raised to 160 to 170° C. and maintained at this value for about 6 hours. The residue is then completely soluble in dilute hydrochloric acid. The entire beryl is then decomposed. The decomposition material is extracted with water, whereby about 62% of the caustic soda employed and about 23% of the silica present go into solution. The residue is then further treated in a manner known per se with acid.

The decomposition residue insoluble in water and aqueous alkali solutions may be worked up in known manner, for example by decomposing the residue with the aid of a mineral acid, such as concentrated sulphuric acid. Complete separation of the silica may then be effected, for example by evaporation. The greater part of the aluminium may be recovered from the filtrate, for example in the form of alum by precipitating with potassium or ammonium sulphate. The beryllium sulphate present in solution is then reacted with ammonia, whereby the beryllium is precipitated as beryllium hydroxide.

An alternative procedure is to treat the sulphuric acid filtrate, after separation of the silica, with ammonia, whereby aluminium, iron and beryllium are precipitated in the form of their hydroxides. By extracting the hydroxide mixture with ammonium carbonate the beryllium goes into solution, whilst iron and aluminium remain behind undissolved.

The process of this invention offers the advantage over the known fusion decomposition process of economizing in fuel and crucible material. It enables decomposition products to be obtained, which are not impurified by destroyed crucible material. It in particular enables pure beryllium compounds to be obtained.

What I claim is:

1. A process for decomposing beryl which comprises heating said beryl with alkaline substances in presence of water to temperatures ranging from 150 to 500° C., extracting the decomposition product with water, decomposing the residue with acids whereby the silicic acid is made insoluble and recovering the beryllium from the solution.

2. A process for decomposing beryl which comprises heating said beryl with alkaline substances in presence of water to temperatures ranging from 150 to 400° C., extracting the decomposition product with water, decomposing the residue with acids whereby the silicic acid is made insoluble and recovering the beryllium from the solution.

3. A process for decomposing beryl which comprises heating said beryl with alkaline substances in presence of water to temperatures ranging from 150 to 500° C., effecting the heating in an autoclave, extracting the decomposition product with water, decomposing the residue with acids whereby the silicic acid is made insoluble and recovering the beryllium from the solution.

4. A process for decomposing beryl which comprises heating said beryl with alkaline acting substances in presence of water to temperatures ranging from 150 to 500° C., extracting the decomposition product with water, decomposing the residue with acids whereby the silicic acid is made insoluble and recovering the beryllium from the solution.

5. A process for decomposing beryl which comprises heating said beryl with alkaline metal hydroxide in presence of water in an autoclave to temperatures ranging from 150 to 500° C., extracting the decomposition product with water, decomposing the residue with acids whereby the silicic acid is made insoluble and recovering the beryllium from the solution.

6. A process for decomposing beryl which comprises heating said beryl with alkaline metal hydroxide in the presence of water to temperatures ranging from 150 to 500° C., extracting the decomposition product with water, decomposing the residue with acids whereby the silicic acid is made insoluble and recovering the beryllium from the solution.

7. A process for decomposing beryl which comprises heating said beryl with alkaline substances in presence of water in an autoclave to temperatures ranging from 150 to 200° C., extracting the decomposition product with water, decomposing the residue with acids whereby the silicic acid is made insoluble and recovering the beryllium from the solution.

GUSTAV JAEGER.